F. H. RICHARDS.
TYPOGRAPHIC MACHINE.
APPLICATION FILED OCT. 27, 1902.
911,681.
Patented Feb. 9, 1909.
5 SHEETS—SHEET 5.
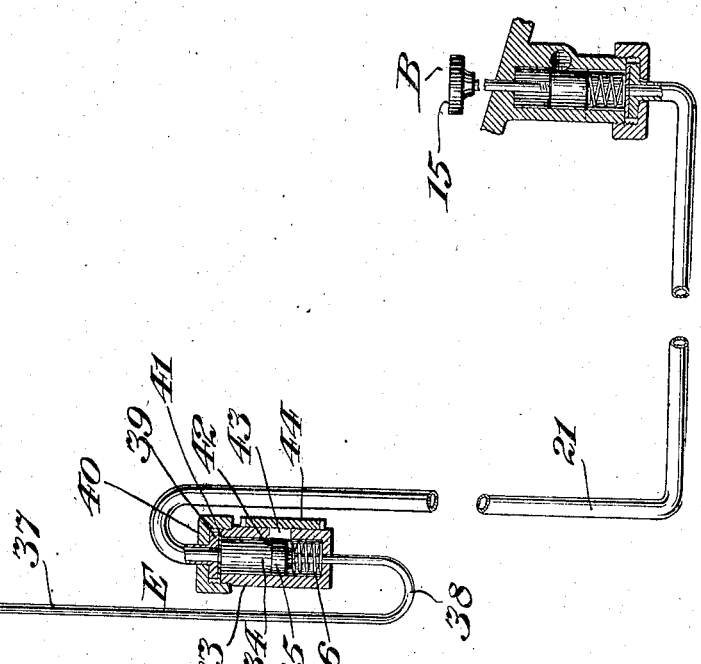
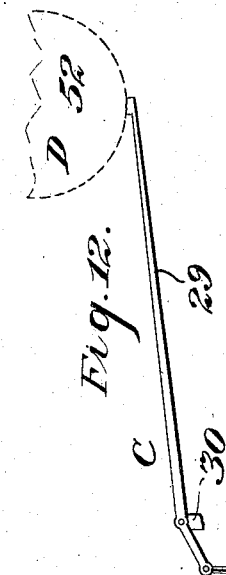
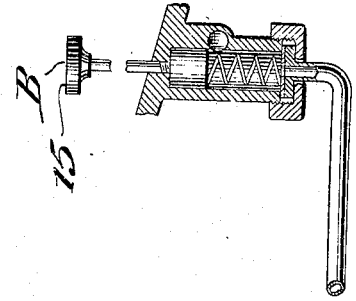
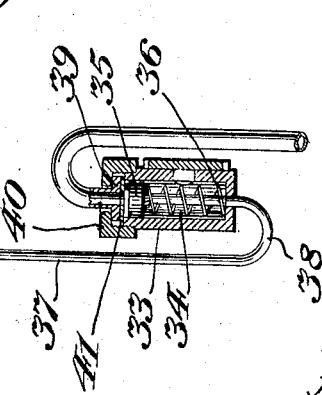
Witnesses.
Inventor:
F. H. Richards.

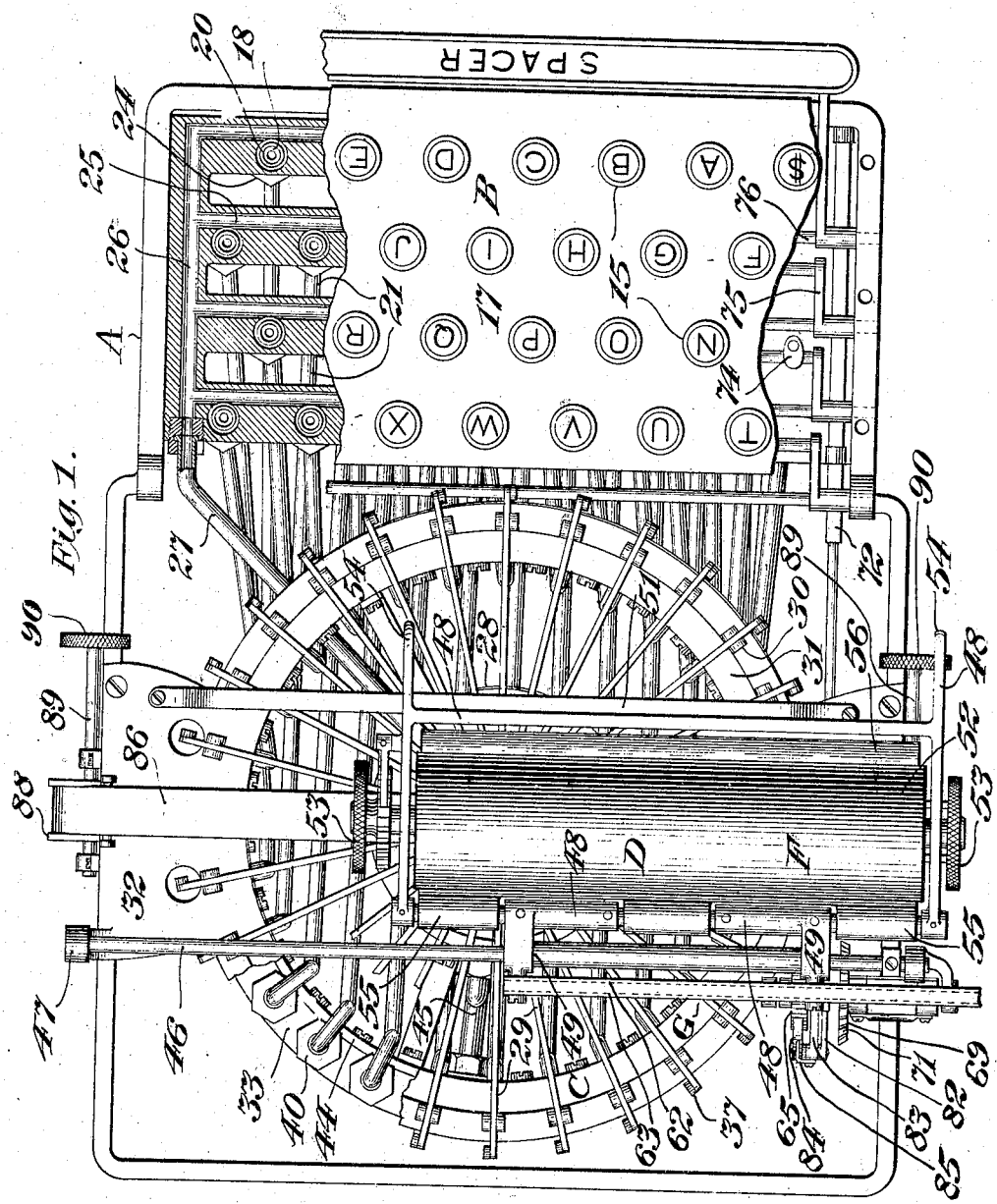

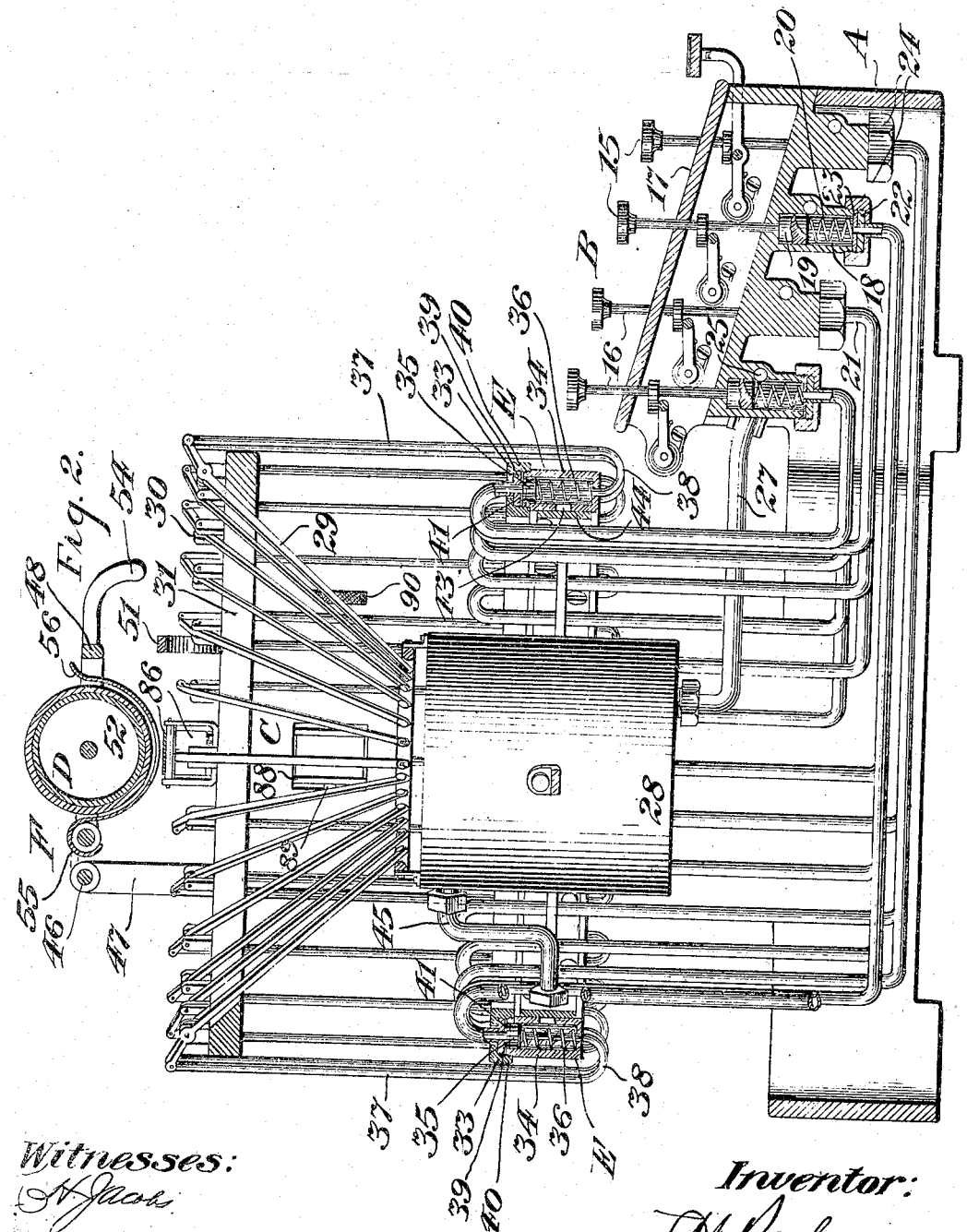

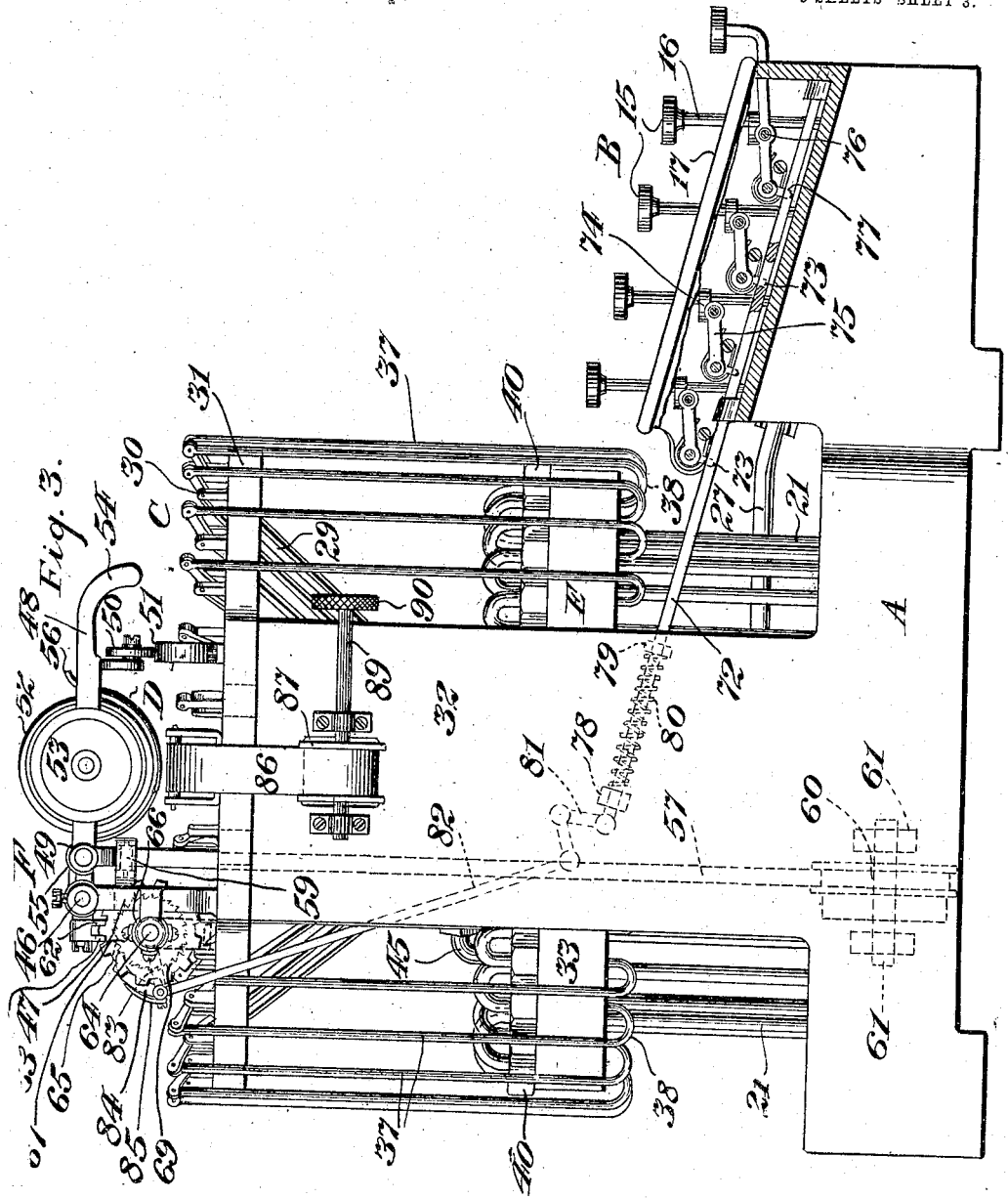

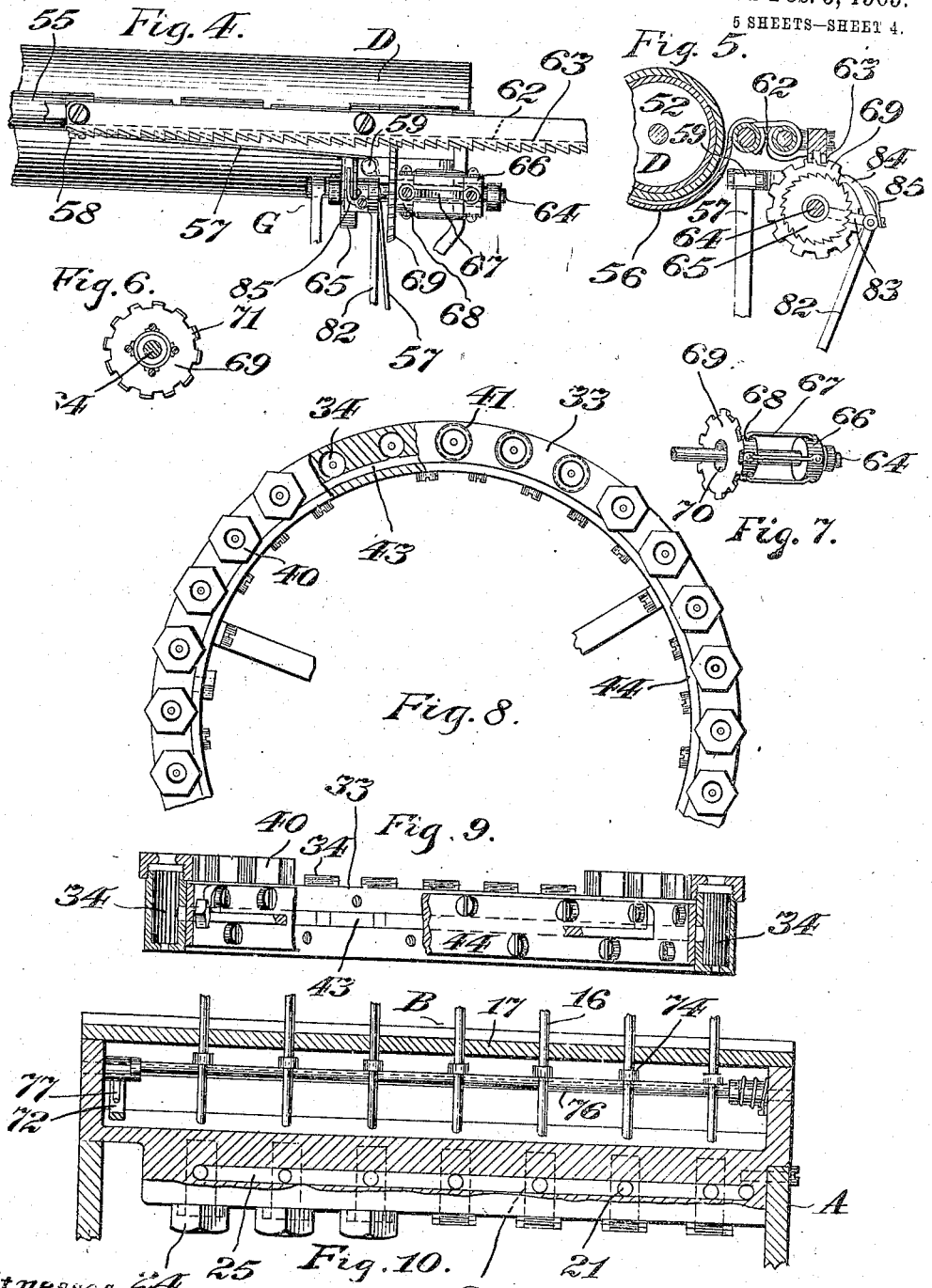

ically at any desired speed irrespective of differences in the speed at which they may be actuated.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 911,681.     Specification of Letters Patent.     Patented Feb. 9, 1909.

Application filed October 27, 1902. Serial No. 128,892.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention relates to means for effecting the operation of any one of a number of actuatable devices from actuators designed for their operation.

In many forms of apparatus wherein it is desired to impart movements from one portion of the apparatus to another it is found inconvenient if not impracticable to do so by levers and similar mechanical devices owing to the different arrangement or formation of the respective sets of parts. If the actuating devices are all arranged in the same formation that the actuated devices are arranged in, for instance, if keys are arranged in a key-board in rows or banks and the actuated members are arranged similarly in rows or banks, it would be a simple matter to connect up the respective members by levers of the same length, but where, as in many machines or apparatuses, the keyboard is arranged in banks and the movable or actuated members are located upon arms arranged in circular formation the problem is complicated, and when other obstacles are placed in the way or located between the two ends of the apparatus it is still more complicated. My invention seeks to overcome this difficulty and make it possible for dissimilarly-arranged series of devices to be actuated one from the other and each set of connected parts respectively to have the same amount of movement imparted and received irrespective of the obstacles which may be interposed between the point of impartation and the point of reception.

In the present embodiment of this system fluid conduits are provided, each having at its end means for forcing a given amount of fluid into the conduit and for causing the increment of fluid to operate a piston or other actuated device at the other end, and the movement impulse imparted at one end to be carried through by means of a body of fluid and delivered at the other end for producing the desired movement, together with a common circulatory system capable of maintaining the various conduits and other portions of fluid apparatus surcharged.

The term "apparatus" as used herein does not necessarily refer to a single machine mounted upon a single frame base, but would include mechanism wherein a keyboard or other actuating device is arranged in form either compactly or separately and the actuated device arranged either in compact form or separated and entirely independent so far as being removed at a distance from the actuating device is concerned. It might be feasible, and in fact desirable, in practice, taking the typewriter as a form of illustration, to place the major part of the apparatus at a considerable distance from the actuating device, in the case of the typewriter key-board, it of course would be connected by the fluid conduits with the major part of the machine. The two portions of the machine thus separated physically would still come within the purview of what is here designated an apparatus.

The key-board, the form of actuator chosen to illustrate this invention, is shown as having its individuals arranged in a formation wherein there are four rows of banks and each row is located slightly higher than the row in front of it, and the characterarms, the form of actuated device chosen for like purpose, are shown as arranged in a formation wherein the individuals occupy positions upon a circle. The arrangement of the individuals of each set into a particular formation and the formation of the other set is so illustrated herein for the purpose of exhibiting the flexibility of the system. If in any apparatus it is found expedient, after the formation of the devices has been fixed, to change the relative positions of the individuals in one set but not to change the corresponding individuals of the other set, it will be possible to do so without disorganizing the entire apparatus or changing the length of stroke of any portion. If it is desired to reorganize the location of the actuating devices, for instance, and let the actuated devices remain where they are, it may be done without recourse to problems of leverage, etc. The relative location of the respective individuals to each other is immaterial. The power transmitters of all the actuators may have uniform movement, and the power-utilizing devices operated from the transmitters and operative upon the actuated devices all may have uniform movement, irrespective of the relative positions of the two individuals connected thereby. Thus it will be seen that this invention differs materially from the classes of machines, among which the typewriter may be named as one instance, wherein the levers for the various keys are of various lengths, and the fulcrums and points for receiving the weight vary, making uniformity of movement and of power applied and transmitted impossible. In this system movement is transmitted immediately from one part of the apparatus to the other. There is provided a train of matter from one part to the other, to which train of matter an impulse is imparted and the same movement which is imparted to the train of matter is passed directly through the constituent individuals or elements making up the train until it reaches the other end. That is the same movement which is imparted at one end is transmitted to the other end. As distinguished from an apparatus in which the movement is transmitted mediately, as for instance, an electrically-operated device embodying an electrical circuit, a circuit-closer and a magnet. The movement impulses by this system may be positively conveyed or transmitted from one part of the apparatus to the other and the matter in such train may be some suitable oil.

In the drawings accompanying and forming part of this specification, Figure 1 is a plan view of a device illustrating a form of employing my invention, Fig. 2 is a longitudinal section thereof, Fig. 3 is a side elevation, Figs. 4 and 5 are details of feed or escapement mechanism, Fig. 6 is an end view of an escapement-wheel or disk, Fig. 7 is a perspective of the escapement-wheel and its hanger. Figs. 8 and 9 are details of pump-cylinders and a supporting ring therefor, Fig. 10 is a section of the actuating devices or pumps; and Figs. 11 and 12 are detached views of the actuating and actuated devices in two positions.

For the purpose of illustrating my invention it is shown herein as applied to a typographic machine of the typewriter class, the latter as illustrated being of conventional form and A designating in a general way the frame of the machine. The actuating device, designated in a general way by B, in the present instance for a similar purpose is shown as a series of finger-keys 15 comprising the key-board of the machine and having depending stems 16 passing through a plate 17 secured to the frame of the machine in any suitable manner. Beneath each key is shown a cylinder 18 in which a piston 19 having a working fit is located and secured to the stem of the key. For the purpose of maintaining the piston at its initial position suitable means, shown as a coiled spring 20, may be employed. Connected with the lower portion of each cylinder is shown a tube or conduit 21 having a head 22 held against the lower part of the cylinder and between which head and the cylinder may be interposed a packing-ring 23 by means of a nut 24.

The arrangement of the actuating apparatus, in the present instance shown as a keyboard, comprises four rows or banks of keys and each row is provided with a supply channel or conduit 25. All of the conduits are connected by a main channel or conduit 26 in communication by means of a tube or conduit 27 with a supply reservoir 28, which in the present instance is shown as centrally located within the machine. The actuated apparatus or device, designated in a general way by C, in the present instance is shown as impression characters mounted upon arms 29 pivoted by means of risers 30 upon a ring 31 secured by means of side extensions 32 to the frame of the machine and arranged in a different formation from the formation of the actuating devices. The characters are so arranged that they will strike upward upon actuation and form impressions upon paper or other substance carried upon a suitable platen, designated in a general way by D, the details whereof will be described later. For the purpose of actuating the character arm suitable pumps or cylinders, designated in a general way by E, and in the present instance shown as arranged in a ring 33 wherein the individual cylinders 34 are located. Each cylinder is provided with a piston 35 shown as having a spring 36 to maintain it in its initial or inactive position. Each piston is shown as connected with its character arm by means of a rod 37 having a bend 38 to permit it to enter the cylinder. Each cylinder is in communication with one of the conduits or tubes 21, which have heads 39 held against the cylinder by means of nuts 40. A suitable packing-ring or gasket 41 may be interposed between the head and the cylinder. Some suitable means, shown herein as lugs or projections 42, may be placed upon the tops of the pistons 35 to strike the cylinder head and thereby limit the movement of the pistons. Upon the inside of the ring 33 is a channel 43 communicating with each of the cylinders at the back of which channel 43 is secured a ring 44, thus making the channel 43 a closed conduit, which conduit is in communication by means of a tube 45 with the upper part of the reservoir 28. The carriage, designated in a general way by F, is in the present instance shown as mounted upon a bar 46 secured in bearings or bosses 47 upon the frame of the machine, in the present instance a part of the extensions 32, the carriage comprising in the present instance a frame 48 having bearings 49 freely sliding upon the rod and a roller 50 running upon a track 51. The platen D may be mounted in the frame of the carriage and is shown as a cylindrical platen 52 provided at each end with hand-wheels 53 whereby it may be manually operated. It is also provided at each end with a suitable handle 54 for the purpose of raising it to inspect the work. At the back of the platen are shown paper-holding rolls 55 and beneath the platen forming fingers 56. A suitable band 57 is shown attached to a lug 58 upon the carriage, passing over a sleeve 59 and is wound upon a spring barrel 60 carried by bearings 61 upon the frame of the machine.

The various piston cylinders 18 are illustrated as made in a single casting and arranged in a number of rows or banks, the supply conduits 25 are formed in such casting and are located in a direction parallel to said rows and each of said supply conduits opens into the various cylinders in its respective row, the main conduit 26 is also formed in said casting and is disposed transversely of the supply conduits.

A suitable escapement, designated in a general way by G, may be employed for permitting the advance of the carriage step by step, each step corresponding with the space between the centers of the characters. In the present instance the escapement comprises a pair of rack-bars 62—63 secured to the carriage and so positioned that the teeth of 62 are located half way between the teeth of 63. A shaft 64 is mounted in the frame of the carriage and has fast thereon a ratchet-wheel 65 and also carries a hub 66 supporting by spring arms 67, a hub 68 of an escapement-disk 69, the boring 70 of the hub 68 and disk 69 as shown is of greater diameter than the shaft. The escapement-disk is shown as provided with wide beveled teeth 71 adapted to engage the racks 62—63 upon the carriage and are so organized that upon rotation one of the teeth will slide past a tooth of rack 62 and the next tooth of the disk will then be in position to engage, upon the forward movement of the carriage, a tooth of rack 63.

For the purpose of moving the shaft 64 suitable means may be provided to be operated by the actuating devices at each action thereof, and in the present instance comprises a bar or rod 72 located at one side of the key-board and provided with a series of openings 73. Each of the keys is shown as provided with a lug or finger 74, and there is shown as pivoted upon each side of the key-board an arm 75, a pair of arms for each row of keys. Each pair of arms is connected by a rod 76 adapted to be engaged by the lugs or fingers 74 upon the respective keys. The arms 75 upon one side of the key-board are provided with downwardly-projecting fingers 77 for engaging the openings 73 in the bar, so that upon the depression of any key the bar will be advanced in the direction of the arrow. The bar is shown as passing through a suitable bearing or support 78 upon the frame of the machine and as having a collar 79, which may be adjustable if desired, between which collar and bearing is interposed a suitable spring 80. The end of the bar 72 is connected to one end of a bell-crank 81, the other end of which bell-crank is connected to a rod 82, which is connected to a rod or arm 83 having a bearing upon the shaft 64 of the escapement, which is shown as carrying a hooked pawl 84 for engaging the ratchet-wheel and as adapted to be held in engagement thereby by means of a suitable spring 85. Upon the depression of each finger-key the bell-crank 81 is rocked and the pawl rides over the ratchet-wheel and engages a new notch thereon, and upon the release of the finger-key the spring 80 will rock the bell-crank and pull back the pawl and ratchet-wheel and move the escapement-disk a sufficient distance that the tooth 71 which is in engagement with one of the racks will be moved out of engagement and the other rack will come in engagement with a tooth of the disk, whereby at each release of a finger-key the carriage is permitted to advance a space equal to one-half the distance between the teeth of one of the racks.

A suitable inking device may be employed, which in the present instance comprises an inking ribbon 86 wound upon spools 87—88 at each end of the device and the spools mounted upon shafts 89, each provided with a knurled head 90 for actuating the ribbon.

The operation of the apparatus as hereinbefore described is as follows:—Upon the depression of a selected finger-key the fluid contained in its cylinder will be forced out and an equal amount of fluid from the conduit forced into the cylinder active upon the selected character device and forces the piston therein down, which will pull down upon the end of the character arm and force the character up toward the platen and against the paper. Upon the piston having reached the end or nearly the end of its working stroke it will uncover the opening in communication with the channel, and thus it will be relieved of the pressure applied thereon, such released fluid flowing into the reservoir. The character arm will thereupon be permitted to drop and upon the release of the key fluid will flow from the tank into its cylinder, at all times maintaining the fluid throughout the entire apparatus uniform, and upon the release of each finger-key the carriage will be permitted to advance a step as heretofore described. The fluid system is so organized that the various parts thereof will be normally surcharged with fluid. After the carriage has reached the end of a line or the end of its movement it may be returned to the starting position by hand, the springs holding the escapement-disk and permitting it to be depressed by the rack upon its movement across it.

The escapement herein has the peculiarity of embodying a one-piece member for permitting the escapement and advance of the carriage, whereas heretofore escapements have always included several pieces or parts.

Having thus described my invention, I claim—

1. The combination with a key-board, a plunger carried by each key, a cylinder for each plunger, an oil reservoir and means connecting this to all the cylinders for normally surcharging these with oil, each cylinder being provided with an opening in proper position to be opened and closed upon the reciprocation of the plunger in said cylinder, of a series of impression devices and levers carrying the same, a piston connected to each lever for operating the same, a cylinder for each of said pistons and the same being provided with an outlet in proper position to be opened and closed upon the reciprocation of the piston in said cylinder, a ring wherein the piston cylinders are mounted, said ring having a channel in communication with the openings from the cylinders, a cover for the channel to make an inclosed conduit thereof, and a conduit connecting said channel with the reservoir.

2. In a device of the character specified, the combination with a key board embodying a number of rows or banks of keys, a cylinder carrying member embodying a casting having a cylinder for each of the keys and also arranged in corresponding rows, a supply conduit for each row formed in said casting and running in a direction parallel to said rows and each opening into the cylinders of its respective row, said casting also having a main conduit formed in it and disposed transversely in said supply conduits and connected to the same for normally surcharging said cylinders, and pistons in said cylinders connected with the respective keys.

Signed at Nos. 9–15 Murray St., New York, N. Y., this 25th day of October, 1902.

FRANCIS H. RICHARDS.

Witnesses:
FRED J. DOLE,
JOHN O. SEIFERT.